(12) United States Patent
Bi et al.

(10) Patent No.: US 8,699,954 B2
(45) Date of Patent: Apr. 15, 2014

(54) METHOD AND DEVICE FOR REDUCING MUTUAL INTERFERENCE OF MULTI-CARRIER

(75) Inventors: Wenzhong Bi, Shenzhen (CN); Jinming Lao, Shenzhen (CN); Fanlong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 166 days.

(21) Appl. No.: 13/259,077

(22) PCT Filed: Dec. 23, 2009

(86) PCT No.: PCT/CN2009/075906
§ 371 (c)(1),
(2), (4) Date: Feb. 7, 2012

(87) PCT Pub. No.: WO2011/017884
PCT Pub. Date: Feb. 17, 2011

(65) Prior Publication Data
US 2012/0129558 A1 May 24, 2012

(30) Foreign Application Priority Data
Aug. 8, 2009 (CN) .......................... 2009 1 0165244

(51) Int. Cl.
*H04B 1/00* (2006.01)
*H04B 15/00* (2006.01)

(52) U.S. Cl.
USPC ....... 455/63.1; 455/422.1; 455/501; 370/203; 370/208; 375/260; 375/285

(58) Field of Classification Search
USPC .............. 455/63.1, 422.1, 501; 370/203, 208, 370/210, 343, 344; 375/260, 285, 295, 296
See application file for complete search history.

(56) References Cited

U.S. PATENT DOCUMENTS 4,939,751 A * 7/1990 Kuroda .......................... 375/324
(Continued)

FOREIGN PATENT DOCUMENTS

CN            1296684 A      5/2001
(Continued)

OTHER PUBLICATIONS

International Search Report in international application No. PCT/CN2009/075906, mailed on May 20, 2010.
English Translation of the Written Opinion of the International Search Authority in international application No. PCT/CN2009/075906, mailed on May 20, 2010.

*Primary Examiner* — Tuan H Nguyen
(74) *Attorney, Agent, or Firm* — Oppedahl Patent Law Firm LLC

(57) ABSTRACT

A method for reducing mutual interference of multi-carrier includes: adjusting the phase of at least one modulated signal; modulating all baseband signals onto respective modulated signals; judging whether all baseband signals can be demodulated correctly, and adjusting the phase of at least one modulated signal when there is any modulated signal which cannot be demodulated correctly, until all the baseband signals can be demodulated correctly; and accepting the current phase value as the phase value of the modulated signal of each baseband signal when all can be demodulated correctly. The present disclosure also discloses a device for reducing mutual interference of multi-carrier. The present disclosure can improve performance obviously under the circumstance of arranging the multi-carrier adjacent to each other, and make multiple carriers operate simultaneously in the same radio signal coverage area, therefore the frequency spectrum utilization ratio is greatly improved.

18 Claims, 4 Drawing Sheets

(56) References Cited

U.S. PATENT DOCUMENTS

| | | |
|---|---|---|
| 7,010,048 B1 | 3/2006 | Shattil |
| 7,443,782 B2 | 10/2008 | Yang et al. |
| 7,873,117 B2 * | 1/2011 | Fukuoka et al. ............... 375/295 |
| 8,243,834 B2 * | 8/2012 | Kishigami et al. ............ 375/260 |
| 2004/0146122 A1 | 7/2004 | Fague |
| 2004/0151254 A1 | 8/2004 | Yang et al. |
| 2009/0103648 A1 | 4/2009 | Fukuoka et al. |
| 2009/0175367 A1 | 7/2009 | Kishigami et al. |

FOREIGN PATENT DOCUMENTS

| | | |
|---|---|---|
| CN | 1514555 A | 7/2004 |
| CN | 101185269 A | 5/2008 |
| CN | 101361307 A | 2/2009 |
| EP | 1435713 A2 | 7/2004 |
| EP | 1881629 A1 | 1/2008 |
| JP | 2005192000 A | 7/2005 |
| RU | 2282944 C2 | 8/2006 |

* cited by examiner

METHOD AND DEVICE FOR REDUCING MUTUAL INTERFERENCE OF MULTI-CARRIER

TECHNICAL FIELD

The present disclosure relates to the processing technology of multi-carrier mutual interference in communication systems, particularly to a method and a device for reducing mutual interference of multi-carrier.

BACKGROUND

At present, most wireless communication systems can support multi-carrier operating mode. Under the multi-carrier operating mode, the carrier signals transmitted and received by related network elements are all combined carriers of a plurality of single carriers. For example, for a CDMA2000 1x communication system in 800 MHz frequency band, the bandwidth of single carrier is 1.23 MHz, the center frequency interval of adjacent carriers is 1.23 MHz, a combined carrier with an occupied bandwidth of about 3.69 MHz is formed by three single carriers each with a bandwidth of 1.23 MHz together when a plurality of carriers, such as three carriers, are arranged adjacent to each other, and the centre frequencies of the three carriers are respectively set to be 871.11 MHz, 872.34 MHz and 873.57 MHz (which also can be other frequencies). FIG. 1 is a diagram of carrier interference of three carriers with adjacent frequency domains in a Code Division Multiple Access (CDMA) system. As shown in FIG. 1, the frequency of the first carrier is 871.11 MHz, the frequency of the second carrier is 872.34 MHz and the frequency of the third carrier is 873.57 MHz. In a multi-carrier mode, partial information of a carrier is aliased in adjacent carriers, that is, the mutual interference of multi-carrier appears, and the interference is particularly obvious when the carriers are arranged adjacent to each other. As shown in FIG. 1, two shadow regions are aliasing regions of the carriers, i.e., partial information of the first carrier is aliased in the second carrier and simultaneously partial information of the second carrier is aliased in the first carrier. The second carrier and the third carrier also have a similar circumstance. When the information of another carrier is aliased in a carrier, the partial information could become an interference to influence the quality of the signal. Owing to the existence of such interference, it is highly likely that the receiver at the receiving end cannot demodulate signals correctly. Such interference has particularly prominent influence on Evolution-Data Optimized (EV-DO) signals in a CDMA system. Certainly, a similar problem of multi-carrier mutual interference also exists in Wideband Code Division Multiple Access (WCDMA), Time Division-Synchronous Code Division Multiple Access (TD-SCDMA) and other systems.

In a multi-carrier wireless communication system, particularly under multi-carrier EV-DO communication mode in a CDMA system, in order to guarantee communication quality, the influence of inter-carrier interference has to be reduced. At present, no solution is available to solve the mutual interference of a plurality of adjacent carriers in a wireless communication system, particularly under multi-carrier EV-DO communication mode in a CDMA system.

SUMMARY

Therefore, a main object of the present disclosure is to provide a method and a device for reducing mutual interference of multi-carrier, which can obviously reduce the mutual interference of a plurality of carriers with adjacent carrier frequencies.

To realize the foregoing object, the technical solution of the present disclosure is realized in the following way.

The present disclosure provides a method for reducing mutual interference of multi-carrier, which includes:
    adjusting a phase of at least one modulated signal;
    modulating all baseband signals onto respective modulated signals;
    judging whether all baseband signals can be demodulated correctly, and adjusting the phase of at least one modulated signal when there is any modulated signal which cannot be demodulated correctly, until all the baseband signals can be demodulated correctly; and accepting a current phase value as the phase value of the modulated signal of each baseband signal when all can be demodulated correctly.

Preferably, the step of adjusting the phase of at least one modulated signal specifically comprises: adjusting simultaneously phases of the modulated signals of all carriers.

Preferably, the step of adjusting the phase of at least one modulated signal specifically comprises: adjusting the modulated signals of all carriers in sequence.

Preferably, when a modulation mode of the baseband signals is cascade modulation, the phases of the modulated signals will be adjusted progressively beginning from the corresponding modulated signal of the first level modulation until baseband signals can be correctly demodulated from all the modulated signals output in the last level. The phase value determined by modulation of each level is set as the phase value of the modulated signal of each baseband signal.

Preferably, the phase of the modulated signal includes a carrier frequency of the modulated signal and an initial phase of the modulated signal.

Preferably, adjusting the phase of the modulated signal is to adjust the initial phase of the modulated signal.

The present disclosure also provides a device for reducing mutual interference of multi-carrier, which comprises an adjustment unit, a modulation unit, a demodulation unit, a judgment unit and a determination unit, wherein:
    the adjustment unit is configured to adjust a phase of at least one modulated signal;
    the modulation unit is configured to modulate all baseband signals onto respective modulated signals;
    the demodulation unit is configured to demodulate all signals modulated by the modulation unit;
    the judgment unit is configured to judge whether the demodulation unit can correctly demodulate all baseband signals, trigger the adjustment unit to further adjust the phase of at least one modulated signal when there is any modulated signal which cannot be demodulated correctly, until all the baseband signals can be demodulated correctly; and trigger the determination unit when all can be demodulated correctly;
    the determination unit is configured to accept the current phase value as the phase value of the modulated signal of each baseband signal.

Preferably, the adjustment unit is configured to adjust simultaneously the phases of the modulated signals of all carriers in the same time.

Preferably, the adjustment unit is configured to adjust the modulated signals of all carriers in sequence.

Preferably, when a modulation mode of the baseband signals is cascade modulation, the adjustment unit adjusts the phases of the modulated signals progressively beginning from the corresponding modulated signal of the first level modulation until the judgment unit determines that baseband signals can be correctly demodulated from all the modulated signals output in the last level. The determination unit sets the phase value determined by modulation of each level as the phase value of the modulated signal of each baseband signal.

Preferably, the phase of the modulated signal includes a carrier frequency of the modulated signal and an initial phase of the modulated signal.

Preferably, the adjustment unit adjusts the initial phase of the modulated signal.

With the above technical solution, the present disclosure has the following advantages: it may satisfactorily solve the mutual interference of multi-carrier signals in a wireless communication system, particularly the mutual interference of multi-carrier EV-DO signals in a CDMA system. The present disclosure can improve performance obviously under the circumstance of arranging the multi-carrier adjacent to each other, and enable multiple carriers to operate simultaneously in coverage area of one radio signal, therefore the frequency spectrum utilization ratio is greatly improved, the flexibility of wireless planning is enhanced, the traffic capacity of cells, transmission rate and service quality are improved, and the user experience is improved.

DETAILED DESCRIPTION

Figure 1:
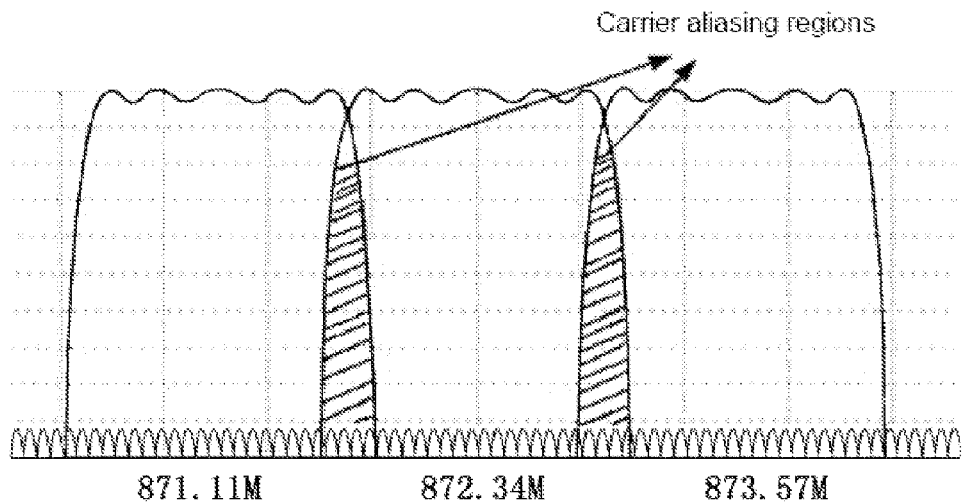
FIG. 1 is a diagram of carrier interference of three carriers with adjacent frequency domains in a CDMA system.

Basic concept of the present disclosure is that: mutual interference is serious in a multi-carrier system, particularly among the carriers with adjacent frequency domains. Through adjusting the phase of the modulated signal of each carrier, the present disclosure can control the interference among a plurality of carriers within a level at which effective signals can be demodulated from the modulated signals. The phase of the modulated signal has a relation with the carrier frequency and initial phase of the carrier, while the carrier frequency of each carrier has been planned by the communication system and is a nonadjustable parameter, so the present disclosure reduces multi-carrier interference mainly through adjusting the initial phase of the modulated signal. The solution of the present disclosure is easy to realize and practical.

The present disclosure will be described in details below in conjunction with embodiments and accompanying drawings, to make its objects, technical solutions and advantages more clear.

In a modern wireless communication system, transmission of the transmitting signal is realized through modulating information onto a modulated signal. The modulated signal can be generated by an apparatus such as Numerical Control Oscillator (NCO) or simulative generator. The modulation process can be completed by a modulator, which may be various types of modulators such as a real number modulator, a complex number modulator and an orthogonal modulator.

Many parameters may represent the characteristics of modulated signals. Two of them are frequency and phase. For example, the modulated signal $C(t)$ may be expressed as: $C(t)=A \times \cos(2\pi ft+\theta)+j \times A \times \sin(2\pi ft+\theta)$, where A is amplitude, f is carrier frequency, $\theta$ is the initial phase of the modulated signal, and $(2\pi ft+\theta)$ is the phase of the modulated signal, which is a function correlative with frequency f, time t and initial phase $\theta$ and is expressed with $W(t, f, \theta)$ in the present disclosure, W for short. If real number modulation is adopted, only the real number part of $C(t)$ is needed.

In a conventional multi-carrier wireless communication system, the inter-carrier interference is reduced only through appointing the frequency of the modulated signal other than specially appointing the phase W of the modulated signal.

W is a function correlative with frequency f, time t and initial phase $\theta$, where t is a variable of time, expresses a characteristic of the signal and is uncontrollable, and f and $\theta$ are two controlled variables. The object of adjusting W may be realized by changing either or both of the variables. In a wireless communication system, the center frequency of the transmitted carriers is strictly required and the deviation range of f is narrow, so the adjustment flexibility is low, while initial phase $\theta$ has a large adjustment range and flexibility. The technical solution of the present disclosure is put forth based on this very characteristic.

Further description will be made below in conjunction with accompanying drawings.

Figure 2:
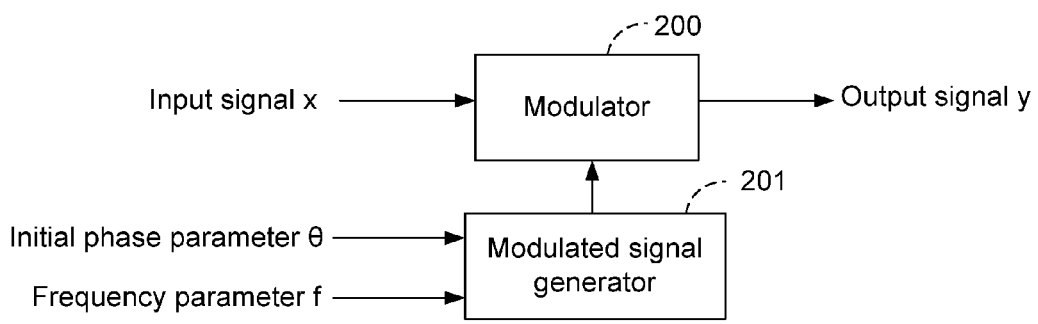
FIG. 2 is a diagram of a single-carrier modulation mode in a wireless communication system.

FIG. 2 is a diagram of a single-carrier modulation mode in a wireless communication system. FIG. 2 shows two components: a modulator 200 and a modulated signal generator 201. The modulator 200 is used for modulating an input signal x onto the modulated signal to obtain an output signal y. The input signal is also known as baseband signal. The output signal contains a modulated baseband signal, i.e. modulated signal. The modulator 200 is a real number modulator, a complex number modulator or an orthogonal modulator commonly used in a wireless communication system. The modulated signal generator 201 generates modulated signals based on input parameters. FIG. 2 only shows two input parameters which are frequency parameter f and initial phase output parameter $\theta$. In a conventional modulation mode, no special appointment is made to the phase of the modulated signal based on the parameters of input signals and on whether effective signals can be demodulated from the output signals in order to achieve the object of reducing inter-carrier interference. Therefore, phase $\theta$ in FIG. 2 is not the function of input signal x and output signal y.

Figure 3:
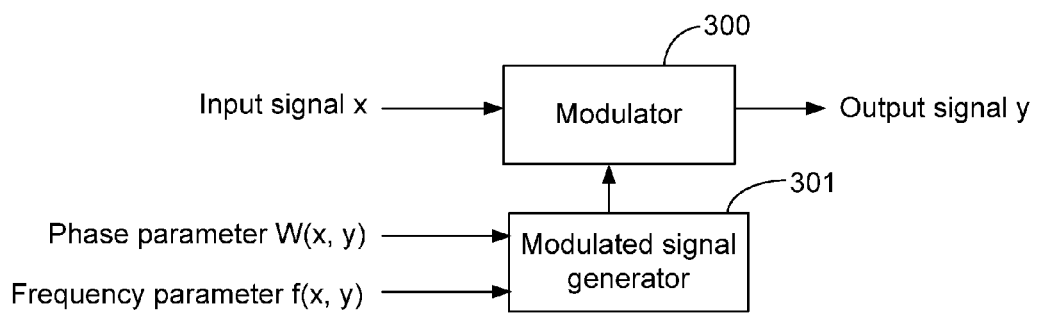
FIG. 3 is a diagram of a multi-carrier modulation mode in the present disclosure.

FIG. 3 is a diagram of a multi-carrier modulation mode in the present disclosure. FIG. 3 also shows two components: a modulator 300 and a modulated signal generator 301, the functions of which are same as that of modulator 200 and modulated signal generator 201 as shown in FIG. 2, but the phase and frequency parameters input into the modulated signal generator 301 are the functions of input signal x and output signal y. Different from the conventional signal modulation process which does not specially appoint the phase of the modulated signal, the present disclosure selectively sets the phase of the modulated signal through the modulation mode as shown in FIG. 3, thus achieving the object of reducing inter-carrier interference.

Figure 4:
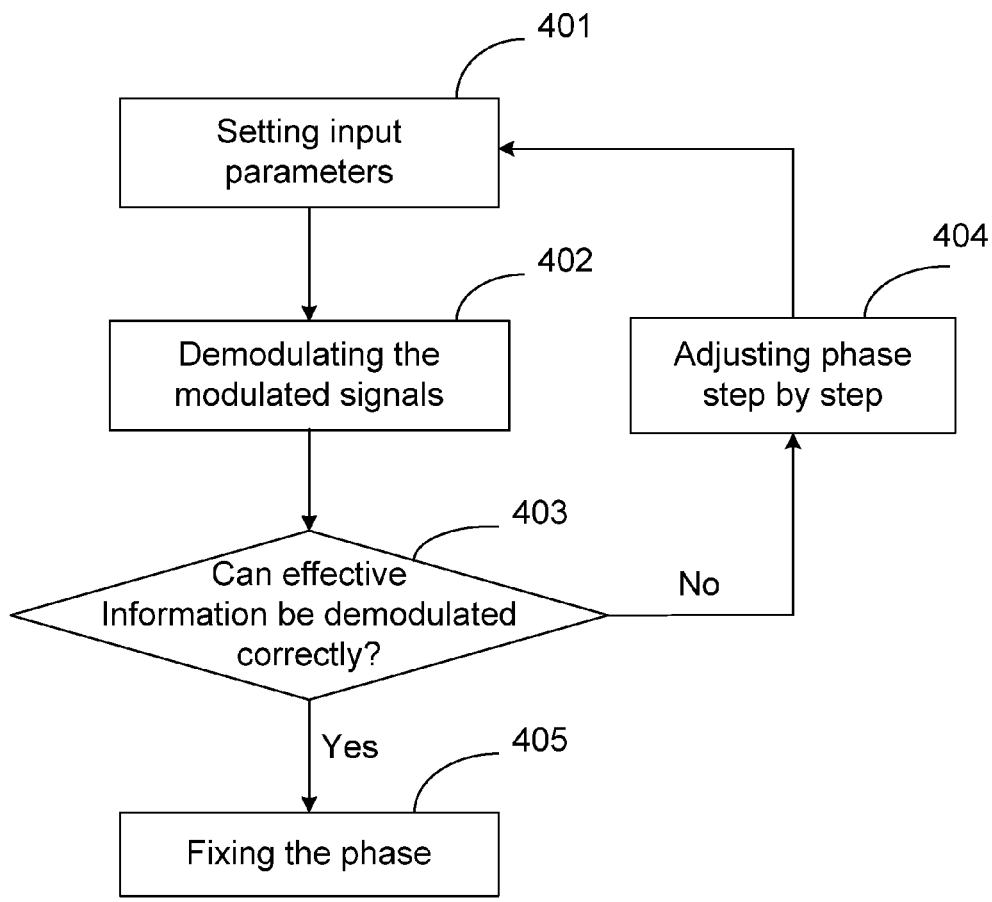
FIG. 4 is a flow chart of a method for reducing mutual interference of multi-carrier in the present disclosure.

FIG. 4 is a flow chart of a method for reducing mutual interference of multi-carrier in the present disclosure. As shown in FIG. 4, the method for reducing mutual interference of multi-carrier in the present disclosure includes the following steps:

Step 401: Setting input parameters. The input parameters include the related parameters expressing the input signal, such as: type of input carrier, which is CDMA 1X signal in this example; number of input carriers, which is three in this example; center frequency information of the input carriers: the adjacent carriers in this example are set as 871.11 MHz carrier, 872.34 MHz carrier and 873.57 MHz carrier; initial phase parameter of the input modulated signal: the initial phase of the carriers in this example will be obtained through the function of random series generators, and the generator seeds are all set as 0 at the beginning of the first time, the initial phase values of three carriers obtained through seed 0 are used as input parameters; and frequency parameter of the primary modulated signal to which the input carrier corresponds: in this example, the adjacent carriers are set as −1.23 MHz, 0 MHz and 1.23 MHz.

Figure 5:
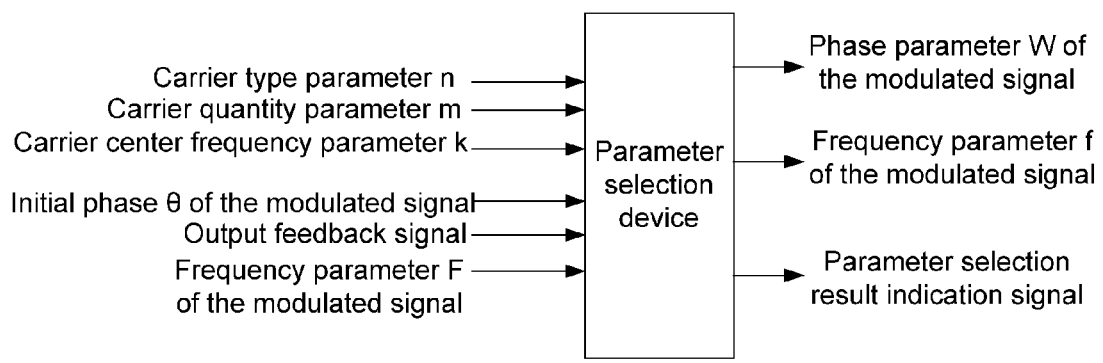
FIG. 5 is a structural diagram of a parameter selection device in the present disclosure.

FIG. 5 is a structural diagram of a parameter selection device in the present disclosure. As shown in FIG. 5, the input parameters the parameter selection device in the present disclosure needs during operation include: carrier type parameter n, carrier quantity parameter m, center frequency information k of the carrier, initial phase θ of the modulated signal, and initial frequency F of the output feedback signal and the modulated signal. During actual application, some or all of the input parameters may be used according to the condition of the system or carriers. The output parameters of the parameter selection device in the present disclosure include phase parameter W of the modulated signal, frequency parameter f of the modulated signal and parameter selection result indication signal. The result indication signal indicates an operating status of the parameter selection device, which is end status or running status. This device works according to the principle of the parameter selection method as shown in FIG. 3 (i.e., continuously adjusting the initial phase of the modulated signal to determine whether the baseband signals modulated onto the modulated signals can be demodulated correctly), and may be used either before or during the operation of the system.

Figure 6:
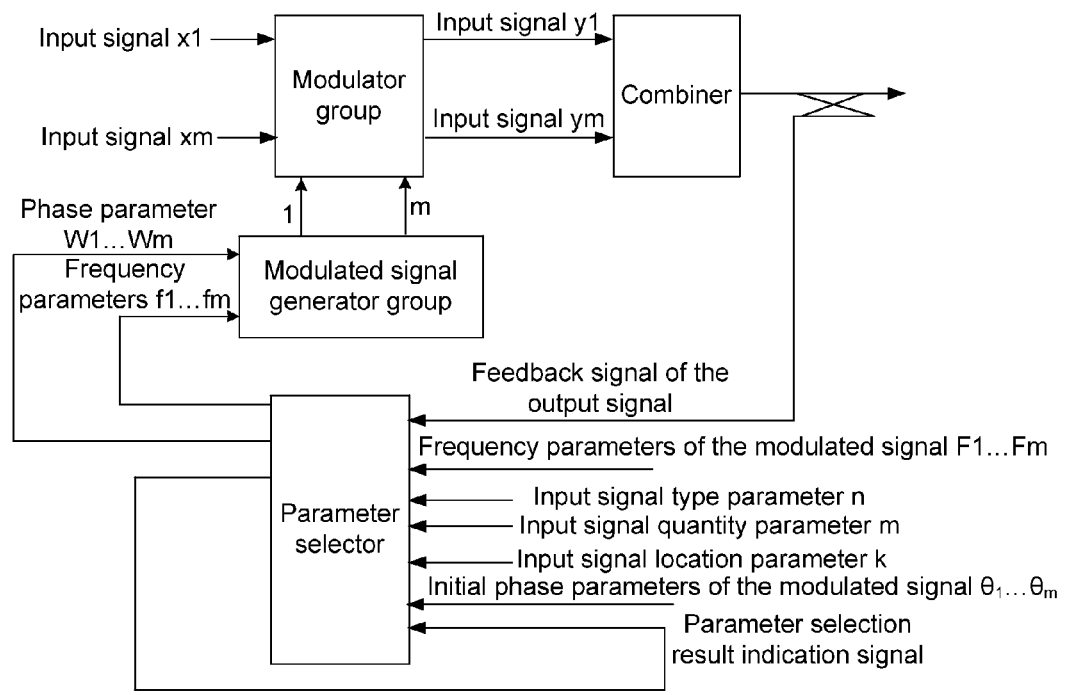
FIG. 6 is a structural diagram of adjusting modulated signals by using a parameter selection device in the present disclosure.

FIG. 6 is a structural diagram of adjusting modulated signals by using a parameter selection device in the present disclosure. As shown in FIG. 6, the modulator group is used for realizing modulation of a plurality of carriers and may consist of various types of modulators as adopted in a wireless communication system. The modulator group has two groups of input signals. One group consists of input carrier signals (baseband signal) x1 . . . xm, and the other group consists of modulated signals 1 . . . m output by the modulated signal generator. The combiner is used for combining m modulated single carriers. The coupler is used for feeding back the output signal to the parameter selection device, as an input parameter of the parameter selection device, based on which together with other input parameters, the parameter selection device selects a phase parameter by a specific optimization algorithm. In the end, the selected phase parameter W and frequency parameter f are input into the modulated signal generator. The present disclosure also comprises a demodulator (not shown), which demodulates the modulated signals output at last. The modulated signals output at last may be input into the demodulator after multiplexing. The demodulation result of the demodulator is input into the parameter selection device in the present disclosure, as a basis for determining whether continued adjustment to the initial phase of the modulated signal is necessary. The existing demodulator may be adopted.

The present disclosure obtains the modulated baseband signal through demodulation by setting a demodulation device and compares it with the preset baseband signal. If they are identical, it will be considered that the inter-carrier interference meets communication requirements; otherwise, it will be considered that it does not meet communication requirements and the initial phase value of each carrier will be adjusted further until baseband signals can be demodulated correctly. This demodulation device may be realized through hardware or software, and may be any of the existing demodulators or software which realizes demodulation through demodulation algorithm.

Step 402: Demodulating the baseband signal modulated by a modulated signal. Signal demodulation is a reverse process of signal modulation, i.e., determining the modulated signal through channel estimation or other methods, and then demodulating the baseband signal.

Step 403: Using the comparison result between the baseband signal demodulated at Step 402 and the preset baseband signal as a basis for selecting the phase of the modulated signal. If the demodulated baseband signal is identical with the preset baseband signal, exit the phase adjustment process and execute Step 405; if not, execute Step 404.

Step 404: Adjusting step size (adjustment amount) and return to Step 401 to further adjust the initial phase of the modulated signal.

The adjustment algorithm of the initial phase of the modulated signal is a process of continuous circulation and the circulation is exited until the demodulated baseband signal meets requirements. The adjustment process of initial phase in the present disclosure will be detailed below.

At first, reference numbers in a downward order are set based on the frequency parameters of the modulated signals in a downward order. For example, the reference number to which −1.23 MHz corresponds in this example is 1, that to which 0 MHz corresponds is 2, and that to which 1.23 MHz corresponds is 3. The priority order of the phases of the modulated signals will be determined based on the reference numbers of the modulated signals. If adjacent arrangement is adopted, then the one with the smallest reference number has the lowest priority, followed by the one with the biggest reference number, and the priorities of other reference numbers are arranged in order of the reference numbers, i.e., the bigger reference number has a higher priority, vice versa. If the carriers are not arranged adjacently, the reference numbers of the modulated signals represent priority, which is that bigger reference number has higher priority. After the setting is completed, a digit group in which a priority corresponds to a modulated signal and the priorities are arranged in a downward order will be obtained. In this example, the carrier frequencies of the carriers are continuous, so the priority to which each reference number corresponds is: No. 1 corresponds to priority 1, No. 2 corresponds to priority 3 and No. 3 corresponds to priority 2. The bigger the priority number, the higher the priority will be.

During adjustment of initial phase, the step size (adjustment amount) for each adjustment needs to be set. The step size for rough adjustment set in the present disclosure is 20°. If it cannot meet the requirements, the step size will be reduced gradually until appropriate initial phase is determined.

Step size 20° is taken as an example to explain how the present disclosure realizes adjustment to the initial phase of carriers. The initial phase values of carriers 1, 2 and 3 are changed respectively (typically, the initial phase value is 0° in the beginning). It should be noted that the changes of the initial phase values of the three carriers are not completely the same. Whenever the initial phase values of the carriers are adjusted, if the step size of the adjustment of the three carriers is same, it means the change of the initial phase of the three carriers is 0° all the time and the interference condition will be same all the while, too. Such phase adjustment is meaningless. The present disclosure is to determine the smallest interference between a phase value to which a carrier corresponds (choosing the integral multiple of step size as the increment) and a phase value to which another carrier corresponds (choosing the integral multiple of step size as the increment), and chooses the initial phase with the smallest interference (the phase value of the current modulated signal) as the initial phase of the modulated signal of the baseband signal.

As mentioned above, the change value of the initial phase of each carrier may be realized through the foregoing parameter selection device, provided that a carrier increase/decrease marker is set for each carrier pursuant to the set procedure (choosing the integral multiple of the foregoing step size as the increment), and all interference conditions among the initial phases of all carriers are determined.

When the step size is 20°, if baseband signals cannot be simultaneously demodulated from all carriers correctly, then the step size will be adjusted, to 10° for example. After that, the interference among carriers in different initial phase will be determined by the foregoing method again (whether baseband signals can be demodulated from all carriers). The initial phase of the modulated signal at which baseband signals can be demodulated correctly from all carriers is chosen as the initial phase of the modulated signal of the baseband signal of each carrier. If the modulated signal of the baseband signal of each carrier still cannot be determined when the step size is 10°, the step size will be further adjusted, to 5° or 1° for example. Then the initial phase of each carrier will be adjusted by the foregoing method again, thus determining the modulated signal enabling baseband signals to be demodulated correctly from all carriers.

It should be noted that the initial phase of each carrier mentioned above may adopt a way of simultaneous adjustment, i.e., the initial phase values of all carriers are changed simultaneously (the initial phase values of the carriers are different in the same time), thus the modulated signal enabling baseband signals to be demodulated correctly from all carriers is determined; or may adopt a way of successive adjustment to the initial phase of each carrier, i.e., the initial phase values of at least one carrier are changed at first, while the initial phase value of at least one carrier remains unchanged, thus determining the modulated signal enabling baseband signals to be demodulated correctly from all carriers. Regardless of the adjustment method of initial phase, the method to determine the modulated signal is same.

It should be noted that the present disclosure is also applicable to circumstances of adjustment of at least three carriers. Specifically, the step size of adjustment to initial phase of each carrier is set by the foregoing method. The interference of the carriers in each initial phase (choosing the integral multiple of step size as the increment) is checked until the modulated signal enabling baseband signals to be demodulated correctly from all carriers is determined.

Step 405: Fixing the initial phase of each carrier, i.e., the currently determined initial phase value is set as the initial phase value of the modulated signal, which modulates baseband signals.

It should be noted that when the modulation mode of the baseband signal is cascade modulation, the phases of modulated signals will be adjusted progressively beginning from the corresponding modulated signal of the first level modulation until all the modulated signals output in the last level can correctly demodulate baseband signals. The current initial phase determined by modulation of each level is set as the initial phase of the modulated signal of the baseband signal.

Figure 7:
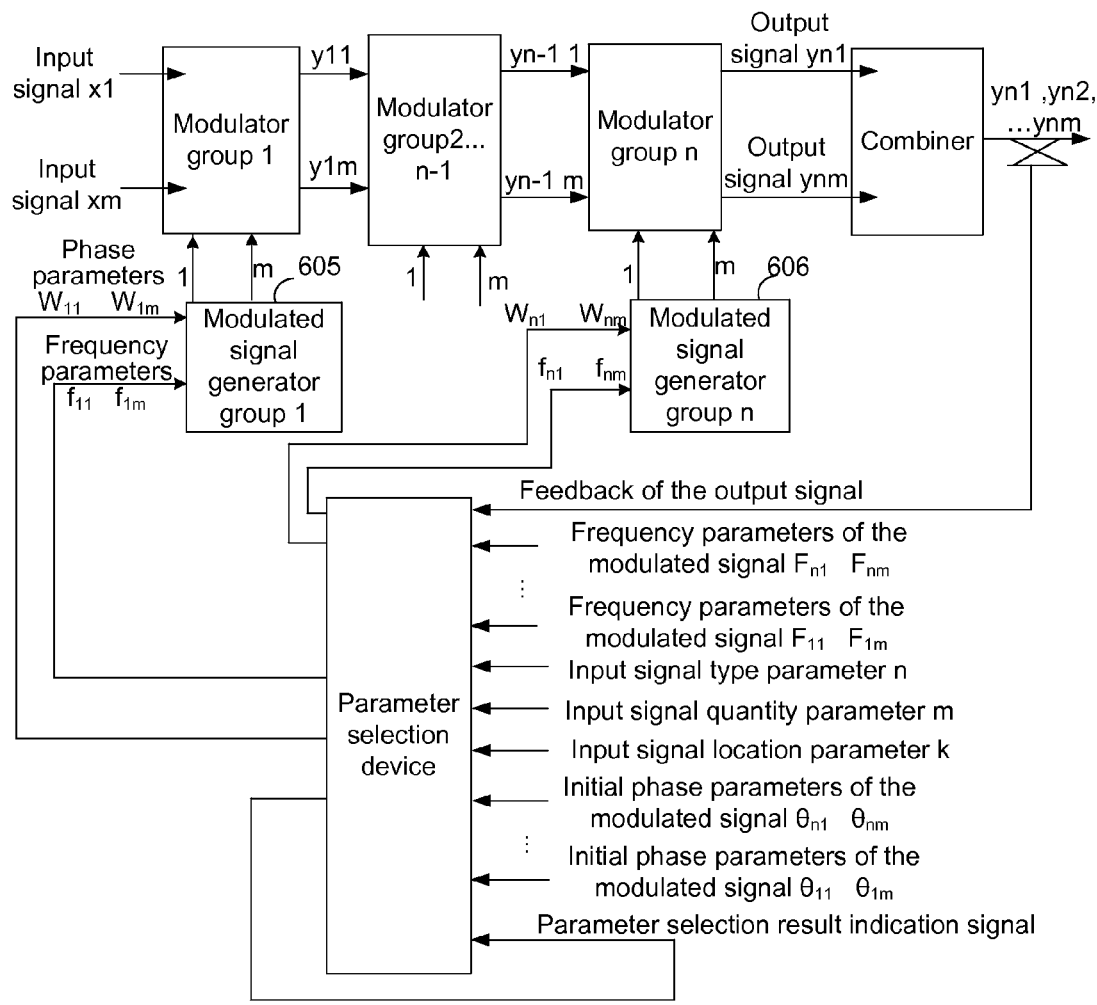
FIG. 7 is a structural diagram of a processing device for reducing interference used for multi-level modulation of the carrier in the present disclosure.

FIG. 7 is a structural diagram of a processing device for reducing interference used for multi-level modulation of the carrier in the present disclosure. FIG. 7 shows the application of n-level modulation of m carriers. The modulator group of each level adjusts the modulated signals generated by the modulated signal generator group by a method similar to the foregoing adjustment method. Among the input parameters of the parameter selection device, frequency parameter F of the modulated signal is expanded to m parameters in n groups and the initial phase θ of the modulated signal is expanded to m parameters in n groups. In multi-level modulation, the initial phases of the modulated signals of one level or multiple levels may be adjusted. The purpose is to correctly demodulate baseband signals from the determined modulated signal. The present disclosure also comprises a demodulator which demodulates the modulated signals output from the last level (not shown). The modulated signals output at last may be input into the demodulator after multiplexing. The demodulation result of the demodulator is input into the parameter selection device in the present disclosure, as a basis for determining whether continued adjustment to the initial phase of the modulated signals is necessary. The existing demodulator may be adopted.

The technical solution described in the present disclosure is also applicable to different types of multi-carrier in a multi-carrier operating mode, for example, the mixed configuration of carrier EV-DO signals and carrier 1X signals in a CDMA system.

With regard to the inter-carrier interference in different communication systems, the step size of adjustment to initial phase of each carrier is set by the foregoing method. The interference of the carriers at each initial phase (choosing the integral multiple of step size as the increment) is checked until baseband signals can be demodulated correctly from all carriers. The current initial phase value at which baseband signals can be demodulated correctly from all carriers is chosen as the initial phase of the modulated signal of the baseband signal of each carrier. The initial phase in different communication systems is adjusted by a method same as the method adopted in a same system. The standard is still that initial phase at which baseband signals can be demodulated correctly from all carriers is chosen as the initial phase of the modulated signal of the baseband signal of each carrier.

The technical solution described in the present disclosure is also applicable to other wireless communication systems, such as Wideband Code Division Multiple Access (WCDMA) system and Time Division-Synchronous Code Division Multiple Access (TD-SCDMA) system.

Figure 8:
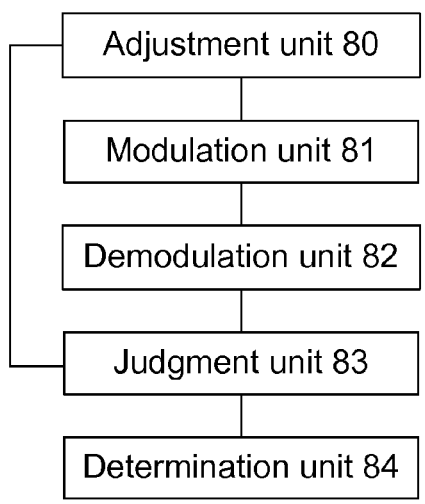
FIG. 8 is a structural diagram of the composition of a device for reducing mutual interference of multi-carrier in the present disclosure.

FIG. 8 is a structural diagram of the composition of a device for reducing mutual interference of multi-carrier in the present disclosure. As shown in FIG. 8, the device comprises an adjustment unit 80, a modulation unit 81, a demodulation unit 82, a judgment unit 83 and a determination unit 84. The adjustment unit 80 is used for adjusting the phase of at least one modulated signal. The modulation unit 81 is used for modulating all baseband signals onto respective modulated signals. The demodulation unit 82 is used for demodulating all signals modulated by the modulation unit. The judgment unit 83 is used for judging whether the demodulation unit 82 can correctly demodulate all baseband signals, triggering the adjustment unit 80 to further adjust the phase of at least one modulated signal when there is any modulated signal which cannot be demodulated correctly, until all the baseband signals can be demodulated correctly; and triggering the determination unit 84 when all can be demodulated correctly. The determination unit 84 is used for accepting the current phase value as the phase value of the modulated signal of each baseband signal. The adjustment unit 80 adjusts simultaneously the phase of the modulated signals of all carriers. The adjustment unit 80 adjusts the modulated signals of all carriers in sequence. The phase of the modulated signal includes a carrier frequency of the modulated signal and an initial phase of the modulated signal. The adjustment unit 80 adjusts the initial phase of the modulated signal.

When the modulation mode of the baseband signal is cascade modulation, the adjustment unit 80 adjusts the phases of modulated signals progressively beginning from the corresponding modulated signal of the first level modulation until the judgment unit 84 determines that baseband signals can be correctly demodulated from all the modulated signals output from the last level. The determination unit 84 sets the phase values determined by modulation of each level as the phase values of the modulated signals of baseband signals.

Those skilled in the art should understand that the device for reducing mutual interference of multi-carrier shown in FIG. 8 of the present disclosure is designed for realizing the foregoing method for reducing mutual interference of multi-carrier. The realization functions of each processing unit in the device shown in FIG. 8 may be understood in reference to the related description in the foregoing method for reducing mutual interference of multi-carrier, and the functions of each unit may be realized through running the program in the processor or through a corresponding logic circuit.

The description above is preferred embodiments of the present disclosure and is not intended to limit the protection scope of the present disclosure.

The invention claimed is:

1. A method for reducing mutual interference of multi-carrier, comprising:
   adjusting a phase of at least one modulated signal;
   modulating each baseband signal onto respective modulated signal; and
   judging whether all baseband signals can be demodulated correctly, and adjusting a phase of at least one modulated signal when there is any modulated signal which cannot be demodulated correctly, until all the baseband signals can be demodulated correctly; and accepting a current phase value as a phase value of the modulated signal of each baseband signal when all can be demodulated correctly;
   wherein when a modulation mode of the baseband signal is cascade modulation, phases of corresponding modulated signals are adjusted progressively beginning from the corresponding modulated signal of the first level modulation until baseband signals can be correctly demodulated from all the modulated signals output in the last level, phase values determined by modulation of each level are set as phase values of the modulated signals of baseband signals.

2. The method according to claim 1, wherein the step of adjusting the phase of at least one modulated signal comprises: adjusting simultaneously phases of modulated signals of all carriers.

3. The method according to claim 2, wherein the phase of the modulated signal includes a carrier frequency of the modulated signal and an initial phase of the modulated signal.

4. The method according to claim 3, wherein adjusting the phase of the modulated signal is to adjust the initial phase of the modulated signal.

5. The method according to claim 1, wherein the step of adjusting the phase of at least one modulated signal comprises: adjusting the modulated signals of all carriers in sequence.

6. The method according to claim 5, wherein the phase of the modulated signal includes a carrier frequency of the modulated signal and an initial phase of the modulated signal.

7. The method according to claim 6, wherein adjusting the phase of the modulated signal is to adjust the initial phase of the modulated signal.

8. The method according to claim 1 wherein the phase of the modulated signal includes a carrier frequency of the modulated signal and an initial phase of the modulated signal.

9. The method according to claim 8, wherein adjusting the phase of the modulated signal is to adjust the initial phase of the modulated signal.

10. A device for reducing mutual interference of multi-carrier, comprising an adjustment unit, a modulation unit, a demodulation unit, a judgment unit and a determination unit, wherein:
    the adjustment unit is configured to adjust a phase of at least one modulated signal,
    the modulation unit is configured to modulate all baseband signals onto respective modulated signals,
    the demodulation unit is configured to demodulate all modulated signals modulated by the modulation unit,
    the judgment unit is configured to judge whether the demodulation unit can correctly demodulate all baseband signals, trigger the adjustment unit to further adjust the phase of at least one modulated signal when there is any modulated signal which cannot be demodulated correctly, until all the baseband signals can be demodulated correctly; and trigger the determination unit when all can be demodulated correctly, and
    the determination unit is configured to accept the current phase value as the phase value of the modulated signal of each baseband signal;
    wherein when a modulation mode of the baseband signal is cascade modulation, the adjustment unit adjusts the phases of modulated signals progressively beginning from the corresponding modulated signal of the first level modulation until the judgment unit determines that baseband signals can be correctly demodulated from all the modulated signals output in the last level, the determination unit sets the phase values determined by modulation of each level as the phase values of the modulated signals of baseband signals.

11. The device according to claim 10, wherein the adjustment unit is configured to adjust simultaneously the phases of the modulated signals of all carriers.

12. The device according to claim 11, wherein the phase of the modulated signal includes a carrier frequency of the modulated signal and an initial phase of the modulated signal.

13. The device according to claim 12, wherein the adjustment unit is configured to adjust the initial phase of the modulated signal.

14. The device according to claim 10, wherein the adjustment unit is configured to adjust the modulated signals of all carriers in sequence.

15. The device according to claim 14, wherein the phase of the modulated signal includes a carrier frequency of the modulated signal and an initial phase of the modulated signal.

16. The device according to claim 15, wherein the adjustment unit is configured to adjust the initial phase of the modulated signal.

17. The device according to claim 10, wherein the phase of the modulated signal includes a carrier frequency of the modulated signal and an initial phase of the modulated signal.

18. The device according to claim 17, wherein the adjustment unit is configured to adjust the initial phase of the modulated signal.

* * * * *